United States Patent
Mueller

(12) 
(10) Patent No.: US 6,235,134 B1
(45) Date of Patent: *May 22, 2001

(54) METHODS FOR ATTACHING AN ELASTOMERIC SLEEVE TO AN ELONGATE ARTICLE

(75) Inventor: Bernard K. Mueller, Bonneville, AR (US)

(73) Assignee: Sealwrap Systems LLC, Indianapolis, IN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/262,432

(22) Filed: Mar. 4, 1999

Related U.S. Application Data

(63) Continuation-in-part of application No. 08/934,956, filed on Sep. 22, 1997, now Pat. No. 5,909,912.

(51) Int. Cl.$^7$ ........................................... B32B 31/00
(52) U.S. Cl. ..................... 156/83; 16/110.1; 16/421; 156/84; 156/85; 264/342 R; 264/343
(58) Field of Search ................... 156/83, 84, 85, 156/86; 264/342 R, 343; 16/110.1, 421

(56) References Cited

U.S. PATENT DOCUMENTS

| | | |
|---|---|---|
| D. 307,169 | 4/1990 | Aldridge . |
| D. 322,637 | 12/1991 | Aldridge . |
| 4,293,201 | 10/1981 | Fukuda et al. . |
| 4,346,890 | 8/1982 | Kaminstein . |
| 4,391,661 | 7/1983 | Izraeli . |
| 4,401,218 | 8/1983 | Erlichman . |
| 4,552,713 | 11/1985 | Cavicchioli . |
| 4,607,866 | 8/1986 | Erlichman . |
| 4,696,842 | 9/1987 | Doubt . |
| 4,714,277 | 12/1987 | Bachel et al. . |
| 4,819,939 | 4/1989 | Kobayashi . |
| 4,865,890 | 9/1989 | Erlichman . |
| 4,912,836 | 4/1990 | Avetoom . |
| 5,098,752 | 3/1992 | Chang et al. . |
| 5,343,776 | 9/1994 | Falco et al. . |
| 5,406,871 | 4/1995 | Lambert, Jr. . |
| 5,407,026 | 4/1995 | Vald'via . |
| 5,419,031 | 5/1995 | McLendon . |
| 5,429,706 | 7/1995 | Cresse et al. . |
| 5,524,885 | 6/1996 | Heo . |
| 5,571,050 | 11/1996 | Huang . |
| 5,584,482 | 12/1996 | Huang . |
| 5,730,662 | 3/1998 | Rens . |
| 5,741,394 | 4/1998 | Kennedy . |
| 5,801,333 | 9/1998 | Jones . |
| 5,909,912 * | 6/1999 | Mueller ................................ 29/446 |
| 5,977,484 | 11/1999 | Jones et al. . |

OTHER PUBLICATIONS

Amoco® Product Description: Amoco® Polybutenes—Physical Properties, Bulletin 12–23d (Date unknown).

Exxon® Product Description: Isopar® Solvents Offer Extraordinary Versatility for Many Uses (Date unknown).

* cited by examiner

Primary Examiner—Jeff H. Aftergut
(74) Attorney, Agent, or Firm—Woodard, Emhardt, Naughton, Moriarty & McNett

(57) ABSTRACT

The present invention provides elastomeric sleeves, such as, for example, grips for hand tools or sports equipment such as golf clubs, tennis racquets, baseball bats and the like, or sleeves for covering joints and/or splices in conduits or electrical devices. The invention also relates to swelling solvents and the use of swelling solvents to expand such a sleeve. In accordance with the invention, the expanded sleeve may be fitted over an elongate article, such as a grip-receiving portion of a golf club shaft or a tool, and contracted by evaporating the swelling solvent therefrom to bring the sleeve into tight contact with the elongate article.

30 Claims, 2 Drawing Sheets

METHODS FOR ATTACHING AN ELASTOMERIC SLEEVE TO AN ELONGATE ARTICLE

REFERENCE TO RELATED APPLICATIONS

The present application is a continuation-in-part of U.S. application Ser. No. 08/934,956, filed Sep. 22, 1997, now U.S. Pat. No. 5,909,912, which is hereby incorporated by reference herein in its entirety.

BACKGROUND OF THE INVENTION

1. Field of the Invention

The present invention relates generally to the attachment of elastomeric sleeves to elongate articles, such as, for example, the attachment of tubing to joints, fittings or welds, or the attachment of grips to hand tools such as hammers, screw drivers, wrenches and the like, or to sports equipment such as golf clubs, tennis racquets, baseball bats and the like. More specifically, the invention relates to temporarily expanding such sleeves using swelling solvents so that the expanded sleeve may be fitted over an elongate article, such as a hand tool or a grip-receiving portion of a golf club shaft, and contracted by evaporating the swelling solvent therefrom to bring the sleeve into tight contact with the article.

2. Discussion of Related Art

It is known in the art that certain types of elastomeric tubing can be used for protecting joints, fittings and welds, so long as such tubing can be placed into tight and intimate contact with the surface which it surrounds. There are a wide variety of situations where it is desirable or necessary to tightly fit an elastomeric sleeve over an elongate article, such as, for example, to seal a joint, to electrically insulate or to prevent corrosion of the article if it is exposed to the elements. There have been developed in the prior art ways to attach such an elastomeric sleeve to an elongate article, including the use of dimensionally recoverable sleeves, which may be expanded, or which are made in an expanded state. The sleeves may be placed into position over a desired article and caused or allowed to contract into tight contact with the article.

Examples of methods and devices used in the prior art to expand an elastomeric sleeve are set forth in U.S. Pat. No. 5,406,871 to Lambert et al., U.S. Pat. No. 5,098,752 to Chang et al. and U.S. Pat. No. 4,391,661 to Izraeli. Introducing a tight-fitting elastomeric sleeve over an elongate article using these methods and devices, however, requires the manufacture of complex devices that are expensive and difficult to handle. For example, sleeves formed of an elastomeric sheet or tube may be held in an expanded state by a restraining means that can be removed or separated from the elastomeric member to permit it to recover to the unexpanded state. Contact adhesives, or other adhesives may be used to seal such a recovered article to a substrate.

Another well-known type of tubing or sleeve is the type that is originally manufactured to be larger than the size it will have in its end use. This type is the heat shrinkable type, which, when applied over a joint and subjected to heat, shrinks tightly into contact with the members forming the joint. Heat shrinkable sleeves such as tubular and wrap-around sleeves may be used to enclose or cover elongate substrates such as pipes, cables, cable joints and/or splices. Such sleeves are useful for providing environmental and corrosion protection, and for providing additional structural integrity, to joints, fittings and welds by which pipes, cables, conduits and other elongated members are joined.

Another lesser-known type of shrinkable tube combines features of the above-described sleeves (i.e., one that must be mechanically expanded, and one that is manufactured in an expanded state and contracted by heating). This lesser-known type of sleeve, referred to as an "air shrink" sleeve, is the subject of the present invention, and is a tube that is originally formed in a contracted state and then treated with chemicals to bring it to a dilated or enlarged state. This type of tubing will remain in its dilated or enlarged state so long as it is kept out of contact with the air. However, once the tubing is brought into contact with the surrounding air, it tends to shrink back to its initial size, without any application of heat, and simply by the contact of the air against the sleeve. Examples of this type of sleeve may be found, for example, in U.S. Pat. Nos. 4,401,218, 4,07,866 and 4,865,890, all to Erlichman.

Air shrink sleeves known in the prior art, however, suffer from a number of disadvantages. For example, prior art air shrink sleeves are made using swelling solvents that have a number of shortcomings. Known solvents used to expand elatomeric sleeves are carcinogenic or otherwise toxic; environmentally unfriendly; have unacceptable flash points for safe shipping, storing or other handling; and/or feature unacceptable rates of expansion and contraction for a wide variety of applications.

In light of the above, there has been a long-felt need for air shrink sleeves that are prepared using evaporative compositions that have a variety of excellent features. For example, there is a great need for products made from compositions that are not toxic; that are not harmful to the environment, specifically the ozone; that have acceptably high flash points for purposes of safe storage and transportation; and that evaporate quickly enough to provide an expanded sleeve the ability to shrink rapidly. The present invention provides novel methods and compositions that exhibit a number of advantageous features when used for the placement of an elastomeric sleeve on an elongate article. Sleeves made in accordance with the invention may be readily attached to an article without the need for specific skill or training, thereby eliminating the inconvenience and delay caused by the time-consuming and labor intensive manner of placing such a sleeve using prior art techniques and products.

SUMMARY OF THE INVENTION

In accordance with the invention, there is provided a method for making a preformed elastomeric sleeve for being attached onto an elongate article, comprising (1) providing a generally tubular elastomeric sleeve having a substantially open first end; the first end providing access to a recess within the sleeve, the recess being formed to receive the article; and, (2) contacting the sleeve with a liquid swelling solvent comprising a cyclic hydrocarbon and a fluorocarbon to provide an expanded sleeve.

In another aspect of the invention, there is provided a method for making a preformed elastomeric sleeve for being attached onto an elongate article, comprising (1) providing a generally tubular elastomeric sleeve having a substantially open first end; the first end providing access to a recess within the sleeve, the recess being formed to receive the article; and, (2) contacting the sleeve with a liquid swelling solvent comprising a trifluoride hydrocarbon and a fluorocarbon to provide an expanded sleeve.

According to another aspect of the invention, there is provided a method for making a preformed elastomeric sleeve for being attached onto an elongate article, comprising (1) providing a generally tubular elastomeric sleeve having a substantially open first end; the first end providing access to a recess within the sleeve, the recess being formed to receive the article; and, (2) contacting the sleeve with a liquid swelling solvent comprising an isoparaffin, a fluorocarbon and a polybutene to provide an expanded sleeve.

In accordance with another aspect of the invention, there is provided a method for attaching a preformed elastomeric sleeve directly onto an elongate article, comprising (1) providing an elongate article having predetermined outside dimensions; (2) providing a generally tubular elastomeric sleeve having a substantially open first end; the first end thereby providing access to a recess within the sleeve, the recess being formed to receive the article; the recess having inside dimensions at least as large as the outside dimensions of the article; wherein the elastomeric sleeve has absorbed therein a liquid swelling solvent comprising a fluorocarbon and a member selected from the group consisting of (i) a cyclic hydrocarbon, (ii) a trifluoride hydrocarbon, and (iii) a mixture of an isoparaffin and a polybutene; (3) positioning the sleeve to have an orientation with respect to the article whereby the article resides in the recess; and (4) maintaining the orientation for a period of time which enables the solvent to evaporate from the sleeve, the evaporating causing the sleeve to contract, thereby causing the sleeve to come into intimate contact with the article and to become attached to the article by friction between the sleeve and the article.

In accordance with another aspect of the invention, there is provided a swelling solvent for expanding an elastomeric sleeve to attach the sleeve to an elongate article, the solvent comprising (1) a fluorocarbon; and (2) a member selected from the group consisting of (i) a cyclic hydrocarbon, (ii) a trifluoride hydrocarbon, and (iii) a mixture of an isoparaffin and a polybutene. The swelling solvent preferably has a solubility parameter of from about 5.0 to about 10.4, a vapor pressure of at least about 20 mm Hg at 38° C. and a flash point greater than about 0° C.

It is an object of the invention to provide an elastomeric sleeve which may readily be attached to an elongate article without the need for extensive training and expensive equipment and materials.

It is also an object of the invention to provide an elastomeric sleeve that may be removed from an article to which it had previously been attached without the need for expensive equipment, solvents and other cleaning compositions.

It is a further object of the invention to provide a method of attaching an elastomeric sleeve to an elongate article quickly, efficiently and inexpensively.

It is another object of the invention to provide a variety of solvents that may be advantageously used to expand an elastomeric sleeve in accordance with the invention.

Further objects, advantages and features of the present invention will be apparent from the detailed description herein.

BRIEF DESCRIPTION OF THE FIGURES

Although the characteristic features of this invention will be particularly pointed out in the claims, the invention itself, and the manner in which it may be made and used, may be better understood by referring to the following description taken in connection with the accompanying figures forming a part hereof.

DETAILED DESCRIPTION OF PREFERRED EMBODIMENTS

Figure 1:
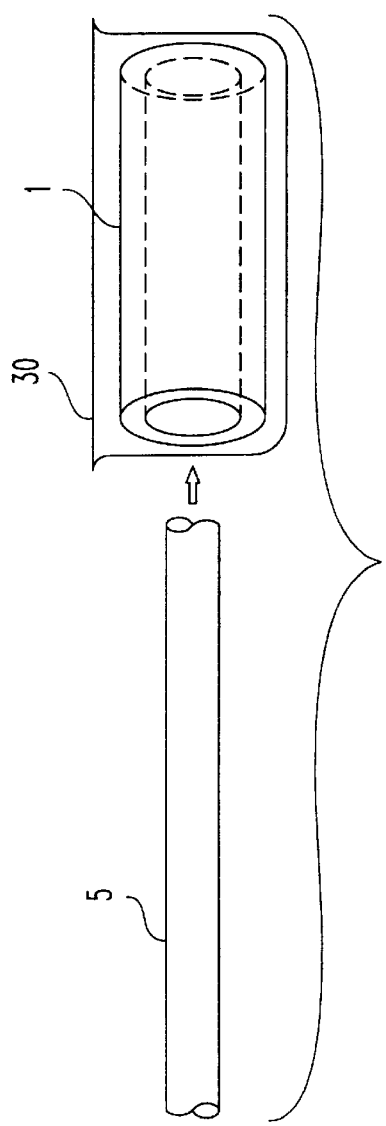
FIG. 1 is a perspective view of an elongate article and an elastomeric sleeve with the sleeve in its expanded state.

For purposes of promoting an understanding of the principles of the invention, reference will now be made to particular embodiments of the invention and specific language will be used to describe the same. It will nevertheless be understood that no limitation of the scope of the invention is thereby intended, such alterations and further modifications in the invention, and such further applications of the principles of the invention as described herein being contemplated as would normally occur to one skilled in the art to which the invention pertains.

The present invention relates in one respect to an improved manner of attaching an elastomeric sleeve to an elongate article by expanding the sleeve with a swelling solvent and, once the sleeve has been positioned, allowing the sleeve to contract by evaporation of the solvent. The invention contemplates attachment of elastomeric sleeves having a wide variety of sizes and shapes to elongate articles. For example, in the area of sports equipment, the invention can be utilized for the attachment of golf grips, hockey grips, racquetball grips, tennis racquet grips, baseball bat grips, softball bat grips, fishing rod grips, lacrosse grips, field hockey grips, ski pole grips, grips for javelins and pole vault poles, and grips for bicycle handle bars, motorcycles, scooters and snowmobiles, and the like. It is, of course, not intended that this list be limiting, but simply provide examples of excellent uses of the invention with respect to sports equipment.

The present invention also finds advantageous use in the manufacture and attachment of grips to other hand-held devices, such as, for example, hand tools and convalescent care devices. With respect to hand tools, the invention may be advantageously utilized, for example, to provide grips for wrench handles, hammer handles, mallet or axe handles, screw drivers, shovels, rakes, sledge hammers, hedge trimmers, grass trimmers, pliers, brooms, wire cutters, jack hammers and wheelbarrow handles. With respect to convalescent care devices, the invention may be advantageously utilized, for example, for attaching handles and/or grips to crutches, wheel chairs and walkers.

In addition to its excellent use in connection with devices having handgrips or the like, the invention also finds advantageous use in covering and/or protecting joints in conduits and/or wires. For example, in the field of manufacturing and repairing motorized vehicles, such as, for example, automobiles, trucks, tractors, recreational vehicles, including off-road recreational vehicles, boats, snowmobiles, construction equipment and the like, an inventive sleeve may be configured for use as a wiring harness sleeve, a wiring harness splice sleeve, a wiring connector boot, a battery cable sleeve, a cable jacket or a hose jacket. Similarly, the invention may be used in automotive, residential and industrial heating and cooling units, wherein it is often difficult to prevent leakage of fluids or to protect electrical devices. In such a unit, the invention may advantageously be used to provide excellent wiring connector boots, sleeves and splices; hose and cable jackets, boots and sleeves; exhaust fan connection seals, heat exchanger seals, coolant pipe connector seals, compressor connector seals and wiring seals. Inventive sleeves may also be used in a variety of additional plumbing applications, electrical applications and in the manufacture or repair of household appliances, such as, for example, washing machines, dryers, dishwashers and icemakers to cover and seal conduits and electrical connections. As used herein, the term "sleeve" or "elastomeric sleeve" is intended to refer to such sleeves as described above and sleeves similar thereto.

Figure 2:
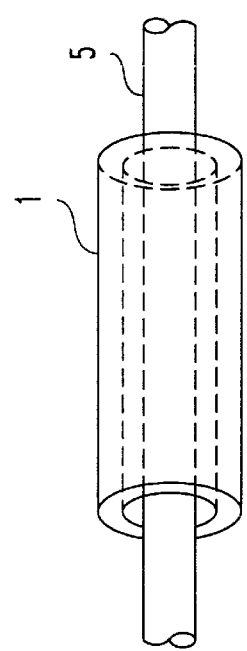
FIG. 2 is a similar view of a sleeve in its expanded state but having the elongate article placed within the recess of the sleeve.
Figure 3:
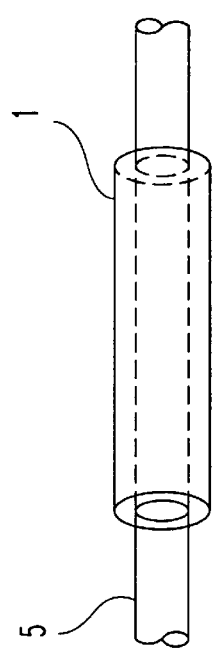
FIG. 3 is a similar view showing the completed sleeve and article assembly after the sleeve has contracted into tight contact with the article.
Figure 4:
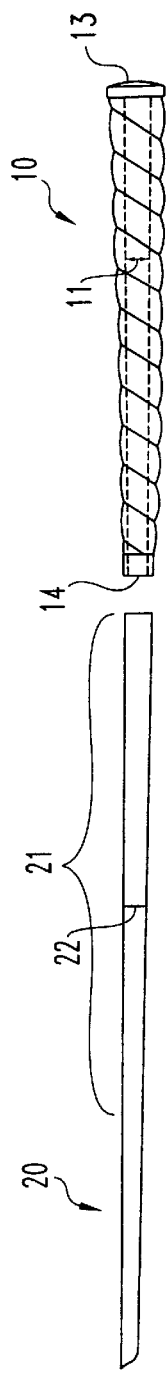
FIG. 4 is a side elevation of a golf club shaft and a grip to be mounted thereon, the grip being in its unexpanded state.

In FIG. 1, there is generically depicted an expanded elastomeric sleeve 1 and an elongate article 5, prior to placement of the sleeve in its intended position. The expanded sleeve is contained in an airtight container 30 to prevent the sleeve from contracting. FIG. 2 depicts the expanded sleeve of FIG. 1 after it has been removed from the container 30 and positioned in its intended position. FIG. 3 depicts the sleeve 1 after it has contracted into tight contact with the article 5.

A sleeve 1 to be attached to article 5 is prepared by providing an unexpanded sleeve and swelling the sleeve by contacting a swelling solvent with the sleeve, thereby increasing the inside diameter of the sleeve so that the sleeve may be positioned into place over the article. With the article located within the recess of the sleeve, as the swelling solvent evaporates from the sleeve, the elastomeric material contracts, thereby coming into contact with the article. It is understood that, in the absence of an article within the recess, the elastomeric sleeve will contract to substantially the same size and shape that it possessed prior to being contacted with the swelling solvent (i.e., prior to expanding the sleeve). When an article is present in the expanded sleeve at the time the solvent evaporates, however, the inside surface of the sleeve, i.e., the surface of the elastomeric composition adjacent the recess, will contract only to the point wherein the inside diameter of the sleeve comes into contact with the article. Further evaporation of the solvent from the sleeve will result in elastomeric tension, thereby attaching the sleeve firmly to the article. Thus, if the sleeve is originally made to have an inside diameter smaller than the outside diameter of the article, upon contracting, the sleeve is in tight contact with the article and will remain attached thereto by friction caused by elastomeric tension.

A sleeve selected for use in accordance with the present invention comprises an elastomeric material and may be made according to methods known in the art for forming elastomeric articles. As stated above, a sleeve made and used in accordance with the invention may be configured in a wide variety of shapes known in the art. For example, suitable shapes for a golf club grip are set forth in U.S. Design Pat. No. Des. 322,637 to Aldridge and U.S. Design Pat. No. Des. 307,169 to Aldridge, which patents, along with all other patents cited herein, are incorporated herein by reference in their entirety. While these sleeves are essentially tubular in shape, the invention also finds advantageous use in connection with nontubular sleeves, such as, for example, locking or zipping sleeves. For example, the invention may utilize sleeves configured as shown and described in U.S. Pat. Nos. 4,607,866 and 4,865,890 to Erlichman. Suitable shapes for a wide variety of other sleeves encompassed by the invention are known to those skilled in the relevant art.

In a wide variety of excellent applications of the invention, for example where an elastomeric sleeve is configured for attachment to a golf club shaft as a golf grip, it will be desirable to configure the sleeve to be substantially tubular and to have an open end and a closed end. Referring to FIGS. 4–7, which depict a golf club/golf grip embodiment, a grip 10 selected for use in accordance with the invention may preferably have a first substantially closed end 13 and a second substantially open end 14; the second end 14 thereby providing access to a recess within the tubular grip. The second end 14 and the recess are formed to receive a grip-receiving portion 21 of a selected device, such as, for example, a golf club shaft 20 in accordance with the invention. It is preferred that a grip 10 selected for use in accordance with the invention have an initial inside diameter 11 that is from about 0% to about 30% smaller than the diameter 22 of the grip-receiving portion 21 of the golf club shaft 20 to which the grip 10 is being attached. More preferably, the grip 10 has an inside diameter 11 that is from about 2% to about 25% smaller than the diameter 22 of the grip-receiving portion 21 of the golf club 20, most preferably, from about 4% to about 20%. For purposes of describing the invention, the term "inside diameter," 11 as used in connection with a grip 10, is intended to refer to the diameter of the recess within the hollow grip. The term "grip-receiving portion" 21 of the golf club refers to the portion of the shaft 20 to which the grip 10 is attached, i.e., the portion at the end of the shaft opposite the club head.

The inside diameter criterion is an important feature in an aspect of the invention, such as the golf club/golf grip embodiment, where the grip must be firmly attached to the club. This criterion is important because a significant amount of elastomeric tension is necessary to provide a satisfactory amount of friction between the grip and the club, thereby attaching the grip firmly to the shaft. Thus, upon contracting, the grip is in tight contact with the shaft and will remain attached thereto by friction, even under large separating forces applied between the grip and the club, such as occur when a golfer swings a club. Similarly, a great deal of friction is necessary in applications involving a number of hand tools where a large amount of torque is applied between the tool and the grip. For example, a high elastomeric tension would be desirable in an embodiment involving attachment of a grip to a screwdriver.

In view of the above, a sleeve made in accordance with the invention comprises an elastomeric material which swells when placed in a suitable swelling solvent. If it is not known whether a particular material falls within the scope of the invention, a determination may be readily made without undue experimentation by testing the swelling characteristics of the material. In this respect, a preferred sleeve used in accordance with the invention comprises an elastomeric material having a solubility parameter of from about 7.0 to about 8.4. More preferably, the elastomeric material selected for use in accordance with the invention has a solubility parameter of from about 7.2 to about 8.2, most preferably from about 7.4 to about 8.0. The term "solubility parameter" as used herein is intended to have its accepted meaning in the field of polymer chemistry. Briefly, quantitative solubility data for nonpolar organic compounds may be calculated from the Hildebrand expression for the square root of the cohesive energy density, which is defined as the solubility parameter. The critical solubility parameter range for nonpolar polymers in nonpolar liquids is believed to be less than about 2 Hildebrand units (H) at temperatures below about 50° C. The calculated solubility parameter of a compound can be used to predict the solubility of most compounds in most solvents, particularly to the extent that the compounds and solvents are nonpolar.

One preferred elastomer which has excellent characteristics for use in accordance with the invention is an ethylene-propylene terpolymer. The term "ethylene-propylene terpolymer" is used herein to designate an elastomer based on stereospecific linear terpolymers of ethylene, propylene, and a relatively small amount of a nonconjugated diene such as, for example, hexadiene, dicyclopentadiene, or ethylidene norbornene, which elastomer may be swelled using a swelling agent selected in accordance with the invention. It is intended that this list of conjugated dienes be illustrative in nature and not be limiting of the invention. The unsaturated part of the polymer molecule is typically pendant from the main chain, which is substantially saturated. The ethylene-propylene terpolymer selected in accordance with the invention preferably has a solubility parameter within the preferred ranges. It is readily understood that variations in an ethylene-propylene terpolymer may occur which do not eliminate the advantageous properties described herein. It is expressly intended that such variations fall within the scope of the invention.

In a preferred aspect of the invention, the elastomer selected as the base polymer of an inventive grip is an ethylene propylene diene monomer ("EPDM"). As used herein, the term "EPDM" is intended to refer to a polymer which includes ethylene monomers, propylene monomers and diene monomers and which may be swelled using a swelling solvent selected in accordance with the invention. It is understood that EPDM may have varying ratios of these monomers and also may include additional monomers. It is preferred that the specific EPDM selected for use have a solubility parameter within the preferred ranges. It is expected that EPDM polymers having a wide variety of such ratios will find advantageous use in the invention. Furthermore, if it is not known whether a particular EPDM falls within the scope of the invention, a determination of its swellability characteristics may readily be determined without undue experimentation.

Another preferred class of elastomers finding advantageous use in accordance with the invention are butyl rubbers. As used herein, the term "butyl rubber" is intended to refer to an elastomer which is made by polymerizing butylene monomers and which has a solubility parameter within the preferred ranges set forth above. One example of a butyl rubber used in a preferred embodiment of the invention is polyisobutylene.

Inventive sleeves may also be made using a silicone rubber, or silicone elastomer. The term "silicone rubber" is used herein to refer to non-fluorinated silicone rubbers. Fluorinated silicone rubbers are not particularly useful in accordance with the present invention because of disadvantageously high solubility parameters. Examples of suitable silicone rubbers are set forth in U.S. Pat. No. 4,552,713 to Cavicchioli. A preferred silicone rubber selected for use in accordance with the invention has a solubility parameter within the preferred ranges set forth above. A preferred silicone rubber contains methyl and/or phenyl groups attached to the silicon atoms of the silicone polymers.

A swelling solvent selected for use in accordance with the invention is one that swells a polymer selected for use therewith and that is preferably non-carcinogenic. In a preferred aspect of the invention, the swelling solvent has a solubility parameter of from about 5.0 to about 10.4. More preferably, the swelling solvent selected for use in accordance with the invention has a solubility parameter of from about 6.1 to about 9.5, most preferably from about 7.2 to about 8.5. For purposes of increasing the safety of handling solvents used in accordance with the invention, it is also preferred, though not critical to the invention, that the solvent have a flash point greater than about 0° C., more preferably greater than about 15° C. and most preferably greater than about 25° C. A preferred solvent has a vapor pressure greater than about 20 mm Hg at 38° C., more preferably greater than about 30 mm Hg at 38° C., more preferably greater than about 40 mm Hg at 38° C. and most preferably greater than about 50 mm Hg at 38° C.

In one preferred aspect of the invention, the swelling solvent comprises an isoparaffin composition and a fluorocarbon. Preferably, at least about 25% of the swelling solvent is an isoparaffin composition, more preferably at least about 50% and most preferably at least about 75%. A preferred isoparaffin composition selected for use in accordance with the invention is the synthetically produced isoparaffinic solvents bearing the brand name ISOPAR®. In a preferred aspect of the invention, the isoparaffin composition has a solubility parameter and a vapor pressure within the preferred ranges set forth above. ISOPAR® solvents are available commercially from Exxon Chemical Company (Houston, Tex.). Preferably, the isoparaffin composition comprises at least about 50% ISOPAR C® by volume. More preferably, the isoparaffin composition comprises ISOPAR C® and ISOPAR E®. In a preferred aspect of the invention, the isoparaffin composition comprises from about 5% to about 95% ISOPAR C® and about 5% to about 95% ISOPAR E®, more preferably at least about 70% ISOPAR C® and up to about 30% ISOPAR E®, most preferably at least about 80% ISOPAR C® and up to about 20% ISOPAR E®.

One disadvantage of, for example, a high purity ISOPAR C®/ISOPAR E® solvent composition is that the flash point of such a mixture ranges from about −7° C. to about 7° C. A fluorocarbon is included in the solvent at a percent composition of up to about 75% fluorocarbon by volume. More preferably, the solvent is from about 5% to about 50% fluorocarbon, and most preferably, from about 5% to about 30% fluorocarbon. The presence of fluorocarbon advantageously increases the flash point of the solvent, and fluorocarbons are also non-carcinogenic, making them suitable for use in preferred solvents.

It is well within the purview of a person of ordinary skill in the art to select a fluorocarbon having the properties described above for use in accordance with the invention. Examples of fluorocarbons that may advantageously be used in accordance with the invention include hydrochlorofluorocarbons ("HCFCs"), hydrofluorocarbons ("HFCs") and perfluorochlorohydrocarbons ("PFCs"). There are disadvantages associated with HCFCs, however. Namely, it has been found that exposure to light causes HCFC molecules to break down, thus changing the properties of the composition, and also having a detrimental effect on the ozone layer. It is therefore preferred that the fluorocarbon selected for use in accordance with the invention be HFC or PFC, neither of which is believed to be broken down by light or to have a negative impact on the ozone. An excellent HFC for use in accordance with the invention may be obtained from E. I. DuPont De Nemours and Company under the name VERTREL. An excellent PFC may be obtained from 3M Corporation under the name 5052-3M.

When the invention is utilized, in certain preferred embodiments, to attach a grip to, for example, a piece of sports equipment or a tool, an additional consideration is the tackiness of the grip. It is well understood by those who use hand tools or play sports that require the use of hand-held equipment, such as, for example, golf, hockey, baseball and the like, that the tackiness of a grip is an important feature which, if absent, results in difficulty gripping the tool or controlling the swing of the sports equipment. As such, another aspect of the invention involves compositions and methods for increasing the tackiness of a grip or other sleeve by impregnating the same with a polymeric composition.

In a preferred aspect of the invention, therefore, the solvent also has dissolved therein a polybutene polymer. When a swelling solvent having polybutene therein is used to expand a golf grip in accordance with the invention, polybutene molecules impregnate the expanded elastomeric material. Subsequently, when the grip is removed from the swelling solvent, the solvent molecules, such as for example, ISOPAR® and/or fluorocarbon molecules, evaporate from the elastomeric grip, leaving behind polybutene dispersed in the contracted elastomeric matrix. The polybutene thereby is integrally associated with the elastomeric matrix and provides a tackiness characteristic to the grip, adding to the excellent feel provided to a person using a tool or piece of sports equipment having the grip attached thereto. Among other advantages, the polybutene also functions to suppress flashing of the solvent, and helps to lubricate the elastomeric sleeve to facilitate the placement of the expanded sleeve over an elongate article.

The solvent preferably comprises from about 0.1% to about 10% polybutene by volume, more preferably from about 0.1% to about 6% and, most preferably, from about 1% to about 4%. The polybutene used in this manner is preferably a polybutene having a Kinematic viscosity (ASTM D445) of less than about 80 cSt at 38° C., more preferably less than about 65 cSt at 38° C. and most preferably less than about 50 cSt at 38° C. Polybutenes advantageously used in accordance with the invention are readily available commercially from AMOCO® Chemicals (Chicago, Ill.).

In an alternative aspect of the invention, the swelling solvent comprises a cyclic hydrocarbon and a fluorocarbon. Preferably, at least about 50% of the swelling solvent, by volume, is a cyclic hydrocarbon, more preferably at least about 70% and most preferably from about 70% to about 90%. It is preferred that the cyclic hydrocarbon selected for use in accordance with the invention be an alicyclic hydrocarbon. Preferably, the cyclic hydrocarbon is a cycloparaffin, more preferably a $C_4$ to $C_{10}$ cycloparaffin and, most preferably a $C_7$ to $C_9$ cycloparaffin. Particularly advantageous cyclic hydrocarbons used in accordance with the invention are cycloheptane, methylcyclohexane, cyclooctane, ethylcyclohexane, dimethylcyclohexane, cyclononane, methylethylcyclohexane, isopropylcyclohexane and mixtures thereof.

The fluorocarbon is preferably selected as described above, and is preferably included in the solvent at a percent composition of up to about 50% fluorocarbon by volume. More preferably, the solvent is from about 5% to about 50% fluorocarbon, and most preferably, from about 5% to about 30% fluorocarbon. As described above, the fluorocarbon advantageously increases the flash point of the solvent, and fluorocarbons are also non-carcinogenic, making them suitable for use in preferred solvents.

This aspect of the invention has been found to provide surprisingly advantageous features for the attachment of elastomeric sleeves to elongate articles. For example, it has been found that, by utilizing cyclic hydrocarbons, swelling solvents prepared in accordance with the invention at a given temperature swell elastomeric compositions faster and to a greater degree than do linear hydrocarbons, and also vaporize faster, thereby decreasing the amount of time necessary for an inventive article to shrink into contact with the article after being placed in ambient air. For example, in experimental work related to the invention, it was found that a solvent comprising cyclic hydrocarbons expands a golf grip about 30 to 50 times faster at a given temperature than a solvent comprising linear paraffins.

The swelling solvent in this aspect of the invention may also comprise a polybutene. The polybutene is preferably selected as described above, and the solvent preferably comprises from about 0.1% to about 10% polybutene by volume, more preferably from about 0.1% to about 6% and, most preferably, from about 1% to about 4%.

In another aspect of the invention, an advantageous swelling solvent used to expand an elastomeric sleeve comprises a trifluoride hydrocarbon and a fluorocarbon. Preferably, at least about 50% of the swelling solvent is a trifluoride hydrocarbon, more preferably at least about 70% and most preferably from about 70% to about 90%. The trifluoride hydrocarbon is preferably a $C_4$ to $C_8$ trifluoride hydrocarbon, more preferably a cyclic trifluoride hydrocarbon, and more preferably, an aromatic trifluoride. For example, an excellent trifluoride hydrocarbon selected for use in accordance with the invention is toluene trifluoride, also referred to as benzotrifluoride or trifluoromethyl benzene. Toluene trifluoride is available commercially from Occidental Chemical Company under the name OXSOL 2000.

The fluorocarbon is preferably selected as described above, and is preferably included in the solvent at a percent composition of up to about 50% fluorocarbon by volume. More preferably, the solvent is from about 5% to about 50% fluorocarbon, and most preferably, from about 5% to about 30% fluorocarbon. As described above, the fluorocarbon advantageously increases the flash point of the solvent, and fluorocarbons are also non-carcinogenic, making them suitable for use in preferred solvents.

A swelling solvent prepared in accordance with this aspect of the invention may also comprise a polybutene. As described above, a polybutene may be utilized to provide a tacky feel the a grip attached to an article in accordance with the invention. In addition, polybutene also raises the flash temperature of inventive solvents, and, when dissolved into a solvent, lubricates the elastomeric sleeve to increase the ease with which a sleeve may be put into position. The polybutene is preferably selected as described above.

Swelling solvents prepared or selected in accordance with the invention may also comprise an odor masking composition. While not necessary for the practice of the invention, it may be desirable in certain circumstances, such as where the invention is to be utilized in a small and/or confined space, to use a masking composition. Masking compositions are readily available commercially. An example of such a composition is AP970, which is available from Kraus & Company, Inc., (Oak Park, Mich.). An excellent swelling solvent may comprise, for example, from about 0.001 to about 0.1% masking composition by weight.

To practice a preferred method of attaching a sleeve to an article in accordance with the invention, a swelling solvent is made or provided as described above. The solvent preferably has an overall solubility parameter of from about 5.0 to about 10.4. More preferably, the solubility parameter of the swelling solvent from about 6.1 to about 9.5, most preferably from about 7.2 to about 8.5. In a preferred embodiment, the swelling solvent is preferably selected from the swelling solvents described herein.

Figure 5:
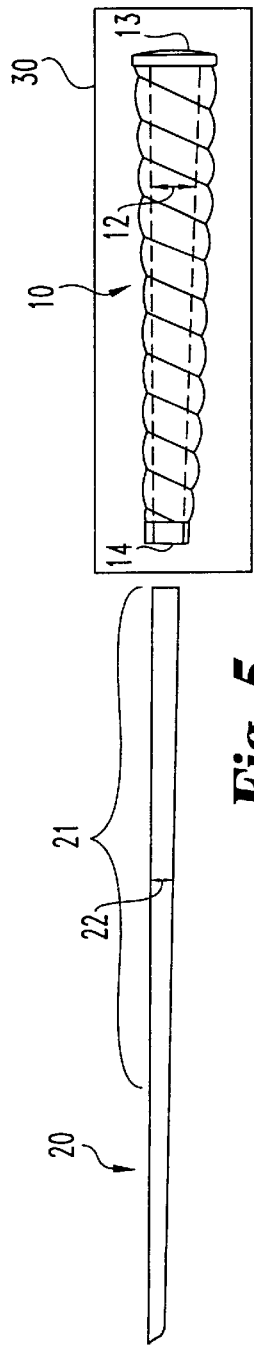
FIG. 5 is a similar view of a golf club shaft and grip with the grip in its expanded state.

Having made or otherwise provided a swelling solvent, an elastomeric sleeve selected in accordance with the invention is contacted with a preselected amount of the swelling solvent for a period of time sufficient to allow the solvent to swell the elastomeric composition, thereby increasing the internal diameter of the sleeve. For purposes of describing this aspect of the invention, the following description relates to a preferred aspect of the invention wherein the sleeve comprises a golf club grip. It is however understood, as described above, that the principles described below may also be applied to sleeves configured in a wide variety of alternative shapes and sizes and to a wide variety of articles. Referring to FIG. 5, which depicts a portion of a golf club shaft 20 and a grip 10 in its expanded state, the post-expanding inside diameter 12 of the grip 10 is at least as large as the diameter 22 of the grip receiving portion 21 of the golf club shaft 20.

In this regard, it is understood that the grip receiving portion of a conventional golf club shaft typically has a diameter 22 of about 560 to about 800 thousandths of an inch. It is critical to the invention that the elastomeric composition of which the grip is comprised and the specific composition of the swelling solvent are selected such that the first internal diameter 11 of the grip 10 in its contracted state is from about 0% to about 30% less than the diameter 22 of the grip receiving portion 21 of the shaft 20 (i.e., typically from about 448 to about 640 thousandths of an inch) and that the second internal diameter 12 of the expanded or swelled grip is at least as large as the diameter 22 of the grip receiving portion 21 of the shaft 20. While the elastomeric compositions and solvent compositions described herein have been found to achieve this advantageous result, it is expected that additional combinations may be selected which also achieve the result. Furthermore, the ratios of compositions in the swelling solvent may be adjusted to adjust the speed whereby the elastomeric composition expands and contracts. Advantageous ratios may be determined without undue experimentation.

Figure 6:
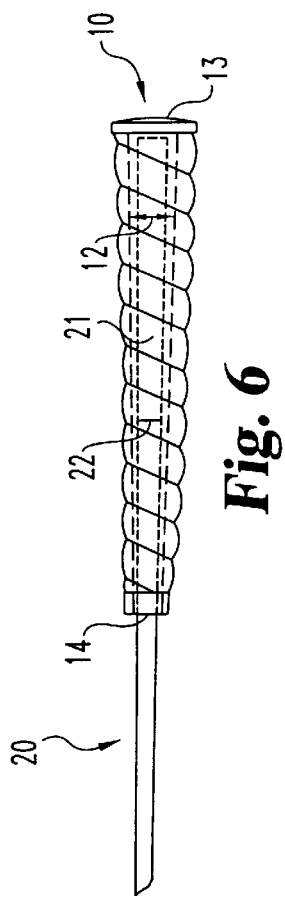
FIG. 6 is a similar view of the grip in its expanded state but having the grip-receiving portion of a golf club shaft placed within the recess of the grip.
Figure 7:
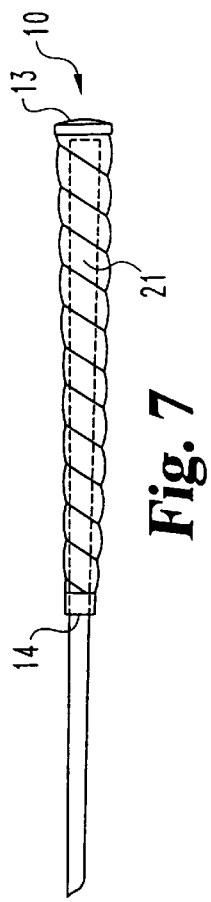
FIG. 7 is a similar view showing the completed grip and club assembly.

When the grip has been expanded such that the internal diameter of the grip has a diameter at least as large as the diameter of the grip receiving portion of a shaft to which it is to be attached, the shaft is inserted into the recess through the substantially open end of the grip as depicted in FIG. 6. It is preferred that the grip-receiving portion 21 of the shaft 20 be substantially free from debris before being inserted in to the expanded grip 10. By this it is meant that, if the club is being re-gripped, it is preferred that the previous grip be substantially removed along with substantially all of the adhesive used to hold the previous grip in place. The present invention may be satisfactorily practiced using a shaft that is not substantially clean; however, a substantial amount of debris left on the shaft may result in an uneven or lumpy feel to the replacement grip. Of course, when the invention is practiced by, for example, a manufacturer to place an original grip on a new golf club, the removal of debris will not be necessary.

Once the shaft is placed into the recess of the expanded grip, the grip and the shaft are maintained in the desired orientation, i.e., with the end of the shaft being placed substantially adjacent the substantially closed end of the grip, for a period of time sufficient for the solvent to evaporate from the grip, thereby returning the grip to a contracted state. The proper orientation may advantageously be maintained by simply leaning the golf club in an upright position against a work bench or any other suitable object. As the grip returns to its contracted state, the internal diameter of the grip will decrease until the internal surface of the grip is in tight and intimate contact with the grip-receiving portion of the shaft. Further contraction of the elastomeric composition of the grip will result in a tighter fit and, therefore, an increased amount of friction between the grip and the shaft. This functions to hold the grip tightly in place so that it will not slip during normal usage of the golf club.

The period of time necessary for the solvent to evaporate from the elastomeric grip will depend upon the compositions present in the solvent and the ratios thereof. For example, an increased proportion of a composition in the solvent having a high vapor pressure will increase the speed that the solvent will evaporate from the grip and, therefore, that the grip will contract. In this regard, in an embodiment of the invention utilizing a swelling solvent comprising an isoparaffin, a fluorocarbon and, optionally, a polybutene, the speed of swelling and contracting may be increased by increasing the proportion of fluorocarbon in the solvent and decreasing the proportion of isoparaffin, and/or polybutene therein. Alternatively, the speed of swelling and contracting may be decreased by adjusting the proportions of fluorocarbon, isoparaffin and/or polybutene in the solvent in the opposite direction. In this regard, it may be desired to adjust the ratios of starting materials for various applications in which speed of swelling or contraction is important or critical.

Rates of expansion and contraction may be similarly varied in aspects of the invention involving trifluoride hydrocarbons, described above, by altering ratios of components. Further, while aspects of the invention involving cyclic hydrocarbons feature significantly more rapid expansion and contraction than do linear paraffins, rates of expansion and contraction may also be varied as described above in this aspect of the invention by altering ratios of components. Such alterations are well within the purview of a person of ordinary skill in the art in view of the present specification.

As a related matter, it may be desired to use the present invention to attach a sleeve having a wide variety of thicknesses. In this case, it may also be advantageous to adjust the ratio of starting materials such that the thicker layer of elastomeric material will have a satisfactory swelling and contracting rate. Furthermore, a greater amount of swelling solvent will be used in direct proportion with the weight of the elastomeric material. In a preferred aspect of the invention, the ratio of solvent to elastomeric composition is greater than about 0.5:1.0 by weight, more preferably greater than about 0.7:1.0 by weight, and is most preferably about 0.9:1.0 by weight.

In a preferred manner of making a sleeve for being tightly attached to an elongate article, a preformed sleeve as described herein is placed in an airtight container and substantially all of the air is removed from the container. In FIGS. 1 and 5, the container 30 is represented schematically. An example of a container that may be used in accordance with the invention is described and illustrated in U.S. Pat. No. 4,401,218 to Erlichman. Alternative types of vacuum-sealed containers may also be used. Next, a preferred amount of solvent is introduced into the airtight container such that the sleeve will absorb the solvent and expand a predetermined amount. An elastomeric sleeve having solvent absorbed therein and packaged in a substantial vacuum as described may be readily shipped and/or stored and will remain in the expanded state so long as the container remains sealed. When the seal is broken, the sleeve is preferably placed over an elongate article quickly because the solvent will immediately begin to evaporate, thereby causing the sleeve to begin contracting.

It is understood, as described above, that the disclosed invention has a wide variety of applications. There are a number of situations where it is advantageous to introduce an elastomeric sleeve over an object such that the sleeve is tightly contacted to the object. One example is in a heating and/or cooling unit wherein conduits or piping carrying gases or liquids are joined. It is not uncommon for such a system to develop leaks due to the difficulty commonly experienced in achieving a satisfactory seal. The present invention may be used in such a situation by providing a generally tubular sleeve having two open ends, comprising an elastomeric composition selected in accordance with the invention and having internal dimensions in its contracted state less than the external dimensions of the article over which it is desired to seal. It is understood that the dimensions need not be uniform to practice the invention. The sleeve may be expanded using solvents selected in accordance with the invention, and placed over the desired location, whereupon the solvent is allowed to evaporate from the elastomeric composition, causing the sleeve to contract, thereby providing an external sealing function to the conduit or piping. Another advantageous use of the invention is to cover an elongate article exposed to the elements or to other corrosive conditions to prevent corrosion of the article.

With respect to grips for tools and sports equipment and the like, the present invention finds advantageous use at the manufacturing level, wherein an original grip is attached to a new tool or piece of sports equipment prior to introducing the same to the market. An additional advantageous use relates to the replacement of an old grip by a consumer, for example, when an original grip affixed to a tool or piece of sports equipment becomes worn, hardened, torn and/or slick.

The invention will be further described with reference to the following specific Examples. It will be understood that these Examples are illustrative and not restrictive in nature.

EXAMPLE ONE

Making An Inventive Sleeve

A swelling solvent is made by combining about 87.0% of ISOPAR C®, about 5.0% of ISOPAR E® and about 8.0% of a fluorocarbon and mixing. A preformed sleeve, comprising about 52% ethylene propylene diene monomer ("EPDM") is contacted with the swelling solvent in a ratio of about 0.9:1 solvent:elastomeric material by weight to provide an expanded sleeve. The expanded sleeve having solvent absorbed therein is then maintained in an airtight container in a substantial vacuum, thereby preventing the solvent from evaporating from the sleeve.

EXAMPLE TWO

Making An Inventive Sleeve

The procedures of Example 1 is followed except that the swelling solvent is prepared by combining about 80.0% of ISOPAR C®, about 5.0% of ISOPAR E®, about 7.0% of a polybutene and about 8.0% of a fluorocarbon and mixing.

EXAMPLE THREE

Making An Inventive Sleeve

A swelling solvent is made by combining about 80% of cyclononane and about 20% of a fluorocarbon and mixing.

A preformed, substantially tubular sleeve, comprising about 52% ethylene propylene diene monomer ("EPDM") is contacted with the swelling solvent in a ratio of about 0.9:1 solvent:elastomeric material by weight to provide an expanded sleeve. The expanded sleeve having solvent absorbed therein is then maintained in an airtight container in a substantial vacuum, thereby preventing the solvent from evaporating from the sleeve.

EXAMPLE FOUR

Making An Inventive Sleeve

The procedure of Example 3 is followed except that the swelling solvent is made by combining about 77% of cyclononane, about 20% of a fluorocarbon, and about 3% of a polybutene and mixing.

EXAMPLE FIVE

Making An Inventive Sleeve

The procedures of Example 3 is followed except that the swelling solvent is prepared by combining about 40% of cyclononane, about 40% of cycloheptane, about 17% of HFC, and about 3% of a polybutene and mixing.

EXAMPLE SIX

Making An Inventive Sleeve

A swelling solvent is made by combining about 90% of toluene trifluoride and about 10% of HFC and mixing. A preformed, substantially tubular sleeve, comprising about 52% ethylene propylene diene monomer ("EPDM") is contacted with the swelling solvent in a ratio of about 0.9:1 solvent:elastomeric material by weight to provide an expanded sleeve. The expanded sleeve having solvent absorbed therein is then maintained in an airtight container in a substantial vacuum, thereby preventing the solvent from evaporating from the sleeve.

EXAMPLE SEVEN

Making an Inventive Sleeve

The procedures of Example 6 is followed except that the swelling solvent is prepared by combining about 87% of toluene trifluoride, about 10% of HFC, about 3% of a polybutene and about 0.01% of AP970 masking composition.

EXAMPLE EIGHT

Attaching a Sleeve to an Elongate Article

An expanded elastomeric sleeve having solvent absorbed therein is made as described in Example 1, 2, 3, 4, 5, 6 or 7, and the expanded sleeve is then removed from the sealed container and placed into position over the elongate article. This orientation is then maintained for a sufficient period of time that the solvent evaporates from the elastomeric sleeve, causing the sleeve to contract. Although the sleeve tends to contract to its original size and shape (and, therefore, returning the inside diameter to its original size), the inside surface of the sleeve contacts the surface of the article before the sleeve reaches its original size and shape. Further evaporation of the solvent from the elatomeric material then causes elastomeric tension in the sleeve to increase, thereby increasing the tightness of the sleeve on the article. When the solvent is substantially evaporated from the sleeve, the sleeve is tightly attached to the article.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A method for attaching a preformed elastomeric sleeve directly onto an elongate article, comprising:
   providing an elongate article having predetermined outside dimensions;
   providing a generally tubular elastomeric sleeve having a substantially open first end; the first end thereby providing access to a recess within the sleeve, the recess being formed to receive the article; the recess having inside dimensions at least as large as the outside dimensions of the article; wherein the elastomeric sleeve has absorbed therein a liquid swelling solvent comprising a fluorocarbon and a member selected from the group consisting of (i) a cyclic hydrocarbon, (ii) a trifluoride hydrocarbon, and (iii) a mixture of an isoparaffin and a polybutene;
   positioning the sleeve to have an orientation with respect to the article whereby the article resides in the recess; and
   maintaining the orientation for a period of time which enables the solvent to evaporate from the sleeve, the evaporating causing the sleeve to contract, thereby causing the sleeve to come into intimate contact with the article and to become attached to the article by friction between the sleeve and the article.

2. The method according to claim 1, wherein the weight ratio of solvent to elastomer material in the sleeve is at least about 0.5:1.0.

3. The method according to claim 1, wherein the sleeve has a substantially open second end; the first and second ends providing access to the recess within the sleeve.

4. The method according to claim 1, wherein the sleeve has a substantially closed second end.

5. The method according to claim 1, wherein the sleeve comprises an elastomeric composition having a solubility parameter of from about 7.0 to about 8.4.

6. The method according to claim 1, wherein the solvent comprises a cyclic hydrocarbon, a fluorocarbon and a polybutene.

7. The method according to claim 1, wherein the solvent comprises a trifluoride hydrocarbon, a fluorocarbon and a polybutene.

8. The method according to claim 1, wherein the solvent comprises an isoparaffin, a fluorocarbon and a polybutene.

9. A method for making a preformed elastomeric sleeve for being attached onto an elongate article, comprising:
   providing a generally tubular elastomeric sleeve having a substantially open first end; the first end providing access to a recess within the sleeve, the recess being formed to receive the article; and,
   contacting the sleeve with a liquid swelling solvent comprising a cyclic hydrocarbon and a fluorocarbon to provide an expanded sleeve.

10. The method according to claim 9, wherein the solvent is absorbed in the elastomeric sleeve.

11. The method according to claim 9, further comprising sealing the sleeve in an airtight container, the container substantially preventing the solvent from evaporating from the sleeve.

12. The method according to claim 9, wherein the solvent further comprises a polybutene.

13. A method for making a preformed elastomeric sleeve for being attached onto an elongate article, comprising:
   providing a generally tubular elastomeric sleeve having a substantially open first end; the first end providing access to a recess within the sleeve, the recess being formed to receive the article; and,
   contacting the sleeve with a liquid swelling solvent comprising a trifluoride hydrocarbon and a fluorocarbon to provide an expanded sleeve.

14. The method according to claim 13, wherein the trifluoride hydrocarbon is a $C_4$ to $C_8$ trifluoride hydrocarbon.

15. The method according to claim 13, wherein the trifluoride hydrocarbon is a cyclic trifluoride hydrocarbon.

16. The method according to claim 13, wherein the trifluoride hydrocarbon is an aromatic trifluoride.

17. The method according to claim 13, wherein the trifluoride hydrocarbon is toluene trifluoride.

18. The method according to claim 13, wherein the solvent further comprises a polybutene.

19. A method for making a preformed elastomeric sleeve for being attached onto an elongate article, comprising:
   providing a generally tubular elastomeric sleeve having a substantially open first end; the first end providing access to a recess within the sleeve, the recess being formed to receive the article; and,
   contacting the sleeve with a liquid swelling solvent comprising an isoparaffin, a fluorocarbon and a polybutene to provide an expanded sleeve.

20. A method for making a preformed elastomeric sleeve for being attached onto an elongate article, comprising:
   providing a generally tubular elastomeric sleeve having a substantially open first end; the first end providing access to a recess within the sleeve, the recess being formed to receive the article; and,
   contacting the sleeve with a liquid swelling solvent comprising a fluorocarbon and a member selected from the group consisting of (i) a cyclic hydrocarbon, (ii) a trifluoride hydrocarbon, and (iii) a mixture of an isoparaffin and a polybutene, to provide an expanded sleeve.

21. The method according to claim 20, further comprising:
   providing an elongate article having predetermined outside dimensions, wherein the expanded sleeve has an expanded recess having inside dimensions at least as large as the outside dimensions of the article;
   positioning the sleeve to have an orientation with respect to the article whereby the article resides in the recess; and
   maintaining the orientation for a period of time which enables the solvent to evaporate from the sleeve, the evaporating causing the sleeve to contract, thereby causing the sleeve to come into intimate contact with the article and to become attached to the article by friction between the sleeve and the article.

22. The method according to claim 20, wherein the weight ratio of solvent to elastomer material in the expanded sleeve is at least about 0.5:1.0.

23. The method according to claim 20, wherein the sleeve has a substantially open second end; the first and second ends providing access to the recess within the sleeve.

24. The method according to claim 20, wherein the sleeve has a substantially closed second end.

25. The method according to claim 20, wherein the sleeve comprises an elastomeric composition having a solubility parameter of from about 7.0 to about 8.4.

26. The method according to claim 20, wherein the solvent comprises a cyclic hydrocarbon and a fluorocarbon.

27. The method according to claim 26, wherein the solvent further comprises a polybutene.

28. The method according to claim 20, wherein the solvent comprises a trifluoride hydrocarbon and a fluorocarbon.

29. The method according to claim 28, wherein the solvent further comprises a polybutene.

30. The method according to claim 20, wherein the solvent comprises an isoparaffin, a fluorocarbon and a polybutene.

* * * * *